United States Patent
Sasaki et al.

(10) Patent No.: US 11,158,946 B2
(45) Date of Patent: Oct. 26, 2021

(54) DUAL LOOP ANTENNA

(71) Applicants: Nippon Telegraph and Telephone Corporation, Tokyo (JP); Toyota Jidosha Kabushiki Kaisha, Aichi (JP)

(72) Inventors: Ai-ichiro Sasaki, Atsugi (JP); Junichi Kodate, Atsugi (JP); Jumpei Fuke, Toyota (JP); Hiroki Okada, Toyota (JP); Hiroko Okuyama, Toyota (JP)

(73) Assignees: Nippon Telegraph and Telephone Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 16/640,385

(22) PCT Filed: Jul. 3, 2018

(86) PCT No.: PCT/JP2018/025139
§ 371 (c)(1),
(2) Date: Feb. 20, 2020

(87) PCT Pub. No.: WO2019/039094
PCT Pub. Date: Feb. 28, 2019

(65) Prior Publication Data
US 2020/0358193 A1    Nov. 12, 2020

(30) Foreign Application Priority Data
Aug. 24, 2017  (JP) ............................. JP2017-161079

(51) Int. Cl.
*H01Q 7/08* (2006.01)
(52) U.S. Cl.
CPC .................................... *H01Q 7/08* (2013.01)

(58) Field of Classification Search
CPC .. H01Q 7/08; H01Q 3/04; H01Q 3/34; H01Q 7/00
See application file for complete search history.

(56) References Cited

U.S. PATENT DOCUMENTS 8,922,440 B2 * 12/2014 Schantz ................... H01Q 7/00
                                                                 343/718
10,340,598 B2   7/2019 Sasaki et al.
(Continued)

FOREIGN PATENT DOCUMENTS

JP    2001-102860 A    4/2001
JP    2002-324215 A    11/2002
(Continued)

OTHER PUBLICATIONS

International Search Report, PCT Patent Application No. PCT/JP2018/025139, dated Sep. 11, 2018.
(Continued)

*Primary Examiner* — Seung H Lee
(74) *Attorney, Agent, or Firm* — Kilpatrick Townsend & Stockton LLP

(57) ABSTRACT

A dual loop antenna is provided which can clearly set a boundary of a communication area and create a well-balanced communication area. A dual loop antenna includes a first loop antenna and a second loop antenna. The first loop antenna and the second loop antenna are formed on an x-y plane. The center of the first loop antenna and the center of the second loop antenna are located at positions on an x-axis at the same distance from the point of origin being the center of the dual loop antenna. A phase difference between currents flowing on the first loop antenna and the second loop antenna, respectively, is a value in a range from 130 degrees to 230 degrees.

6 Claims, 17 Drawing Sheets

(56) References Cited

U.S. PATENT DOCUMENTS

| | | |
|---|---|---|
| 2002/0105470 A1 | 8/2002 | Kim |
| 2011/0260808 A1 | 10/2011 | Uchida |
| 2011/0306296 A1 | 12/2011 | Takahashi |
| 2012/0249371 A1* | 10/2012 | Nguyen .................. G01S 1/68 342/442 |
| 2012/0322372 A1* | 12/2012 | Hansen ................ H04B 5/0081 455/41.1 |
| 2016/0028160 A1 | 1/2016 | Otsuki |

FOREIGN PATENT DOCUMENTS

| | | |
|---|---|---|
| JP | 204-343410 A | 12/2004 |
| JP | 2004-343410 A | 12/2004 |
| JP | 2007-028472 A | 2/2007 |
| JP | 2007-336185 A | 12/2007 |
| JP | 2011-233956 A | 11/2011 |
| JP | 2011-259366 A | 12/2011 |
| JP | 2014-179850 A | 9/2014 |
| JP | 6069548 B1 | 2/2017 |

OTHER PUBLICATIONS

Written Opinion, PCT Patent Application No. PCT/JP2018/025139, dated Sep. 11, 2018.
International Preliminary Report on Patentability, PCT Patent Application No. PCT/JP2018/025139, dated Mar. 5, 2020.

* cited by examiner

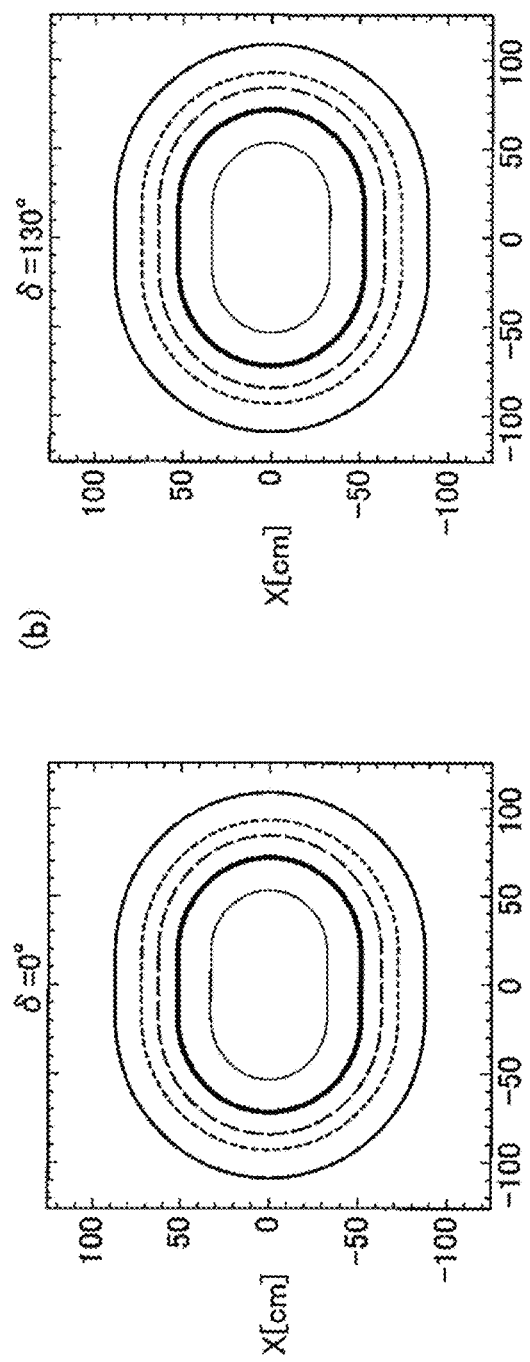
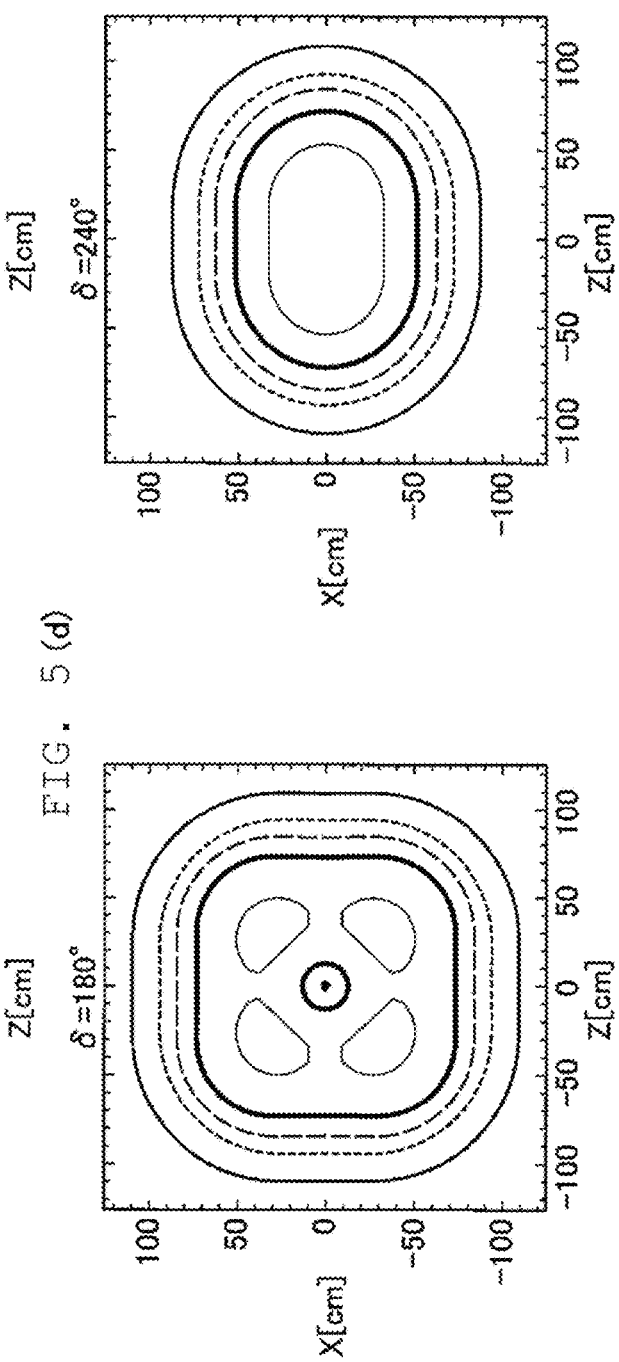
FIG. 5(a)  FIG. 5(b)
FIG. 5(c)  FIG. 5(d)

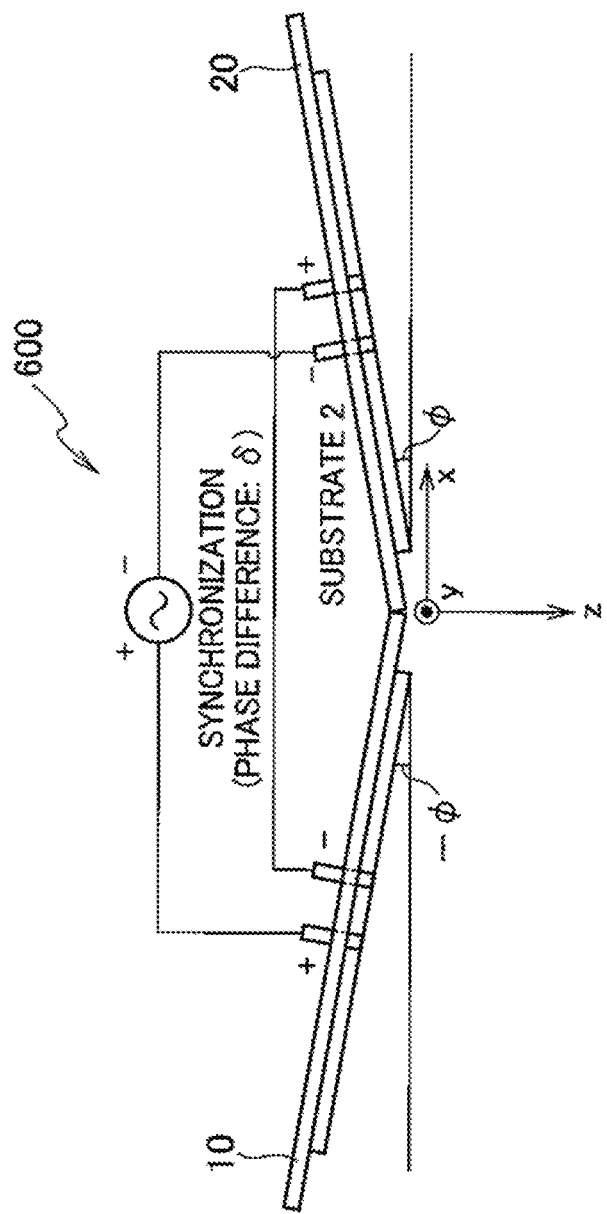

DUAL LOOP ANTENNA

TECHNICAL FIELD

The present invention relates to a dual loop antenna which can clearly set a boundary of a communication area.

BACKGROUND ART

In recent years, there has been a growing need for radio communication within an intentionally limited communication area (limited area communication). A system using a magnetic field has been put into practical use in order to meet this need (Patent document 1, for example).

PRIOR ART DOCUMENT

Patent Document

Patent document 1: Japanese Patent Publication No. 6069548

SUMMARY OF THE INVENTION

Problem to be Solved by the Invention

According to a method disclosed in patent document 1, antennas are arranged such that magnetic moments of the antennas are aligned parallel or antiparallel, and these antennas are connected in series. With this method, it is possible to expand a communication area in the direction of arrangement of the antennas.

However, patent document 1 has a problem that, while the communication area can be expanded in one direction, it is not possible to form a balanced communication area in front-back and right-left directions while locating the antennas at the center.

The present invention has been made in view of this problem and an objective thereof is to provide a dual loop antenna which is capable of clearly setting a boundary of a communication area and creating a well-balanced communication area.

Means for Solving the Problem

An aspect of the present invention is summarized as a dual loop antenna including a first loop antenna and a second loop antenna, in which the first loop antenna and the second loop antenna are formed on an x-y plane and the center of the first loop antenna and the center of the second loop antenna are located at positions on an x-axis at the same distance from the point of origin being the center of the dual loop antenna. Moreover, a phase difference between currents flowing on the first loop antenna and the second loop antenna, respectively, is a value in a range from 130 degrees to 230 degrees.

Effect of the Invention

According to the dual loop antenna of the present invention, it is possible to provide a dual loop antenna which is capable of clearly setting a boundary of a communication area and creating a well-balanced communication area.

BRIEF DESCRIPTION OF THE DRAWINGS

FIG. 4 is a diagram showing magnetic field distribution created by the dual loop antenna illustrated in FIG. 3, in which FIG. 4(a) shows the magnetic field distribution viewed from above and FIG. 4(b) is a diagram showing a halved shape (in +z direction) of FIG. 4(a) in a three-dimensional form.

FIG. 5(a), FIG. 5(b), FIG. 5(c), and FIG. 5(d), collectively FIG. 5 is a diagram showing magnetic field distribution when changing a phase difference between feed signals to the dual loop antenna illustrated in FIG. 3, in which FIG. 5(a) shows the magnetic field distribution when the phase difference $\delta=0°$, FIG. 5(b) shows the magnetic field distribution when the phase difference $\delta=130°$, FIG. 5(c) shows the magnetic field distribution when the phase difference $\delta=180°$, and FIG. 5(d) shows the magnetic field distribution when the phase difference $\delta=240°$.

FIG. 8(a), FIG. 8(b), and FIG. 8(c), collectively FIG. 8 is a diagram showing magnetic field distribution when turning loop antennas constituting the dual loop antenna illustrated in FIG. 6 by angles $\theta°$ around the x-axis, in which FIG. 8(a) shows the magnetic field distribution when $\theta=\pm0°$, FIG. 8(b) shows the magnetic field distribution when $\theta=\pm5°$, and FIG. 8(c) shows the magnetic field distribution when $\theta=\pm15°$.

FIG. 10(a), FIG. 10(b), and FIG. 10(c), collectively FIG. 10 is a diagram showing magnetic field distribution when turning loop antennas constituting the dual loop antenna illustrated in FIG. 9 by angles $\phi°$ around the y-axis, in which FIG. 10(a) shows the magnetic field distribution when $\phi=\pm0°$, FIG. 10(b) shows the magnetic field distribution when $\phi=\pm5°$, and FIG. 10(c) shows the magnetic field distribution when $\phi=\pm15°$.

FIG. 12(a), FIG. 12(b), and FIG. 12(c), collectively FIG. 12 is a diagram showing magnetic field distribution when changing a phase difference between feed signals to the dual loop antenna illustrated in FIG. 11, in which FIG. 12(a) shows the magnetic field distribution when the phase difference $\delta=180\pm0°$, FIG. 12(b) shows the magnetic field distribution when the phase difference $\delta=180\pm5°$, and FIG. 12(c) shows the magnetic field distribution when the phase difference $\delta=180\pm15°$.

FIG. 14 is a diagram showing magnetic field distribution when changing a phase difference between feed signals to the dual loop antenna illustrated in FIG. 13, in which FIG. 14(a) shows the magnetic field distribution when the phase difference $\delta=180+10°$ and a turning angle $\theta=\pm0°$, and FIG. 14(b) shows the magnetic field distribution when the phase difference $\delta=180+10°$ and the turning angle $\theta=\pm2°$.

FIG. 15 is a diagram showing a configuration example of a dual loop antenna according to a sixth embodiment.

FIG. 16 is a diagram showing magnetic field distribution when changing a phase difference between feed signals to the dual loop antenna illustrated in FIG. 15, in which FIG. 16(a) shows the magnetic field distribution when the phase difference ι=180+0° and a turning angle φ=±15°, and FIG. 16(b) shows the magnetic field distribution when the phase difference δ=180+6° and the turning angle φ=±15°.

MODES FOR CARRYING OUT THE INVENTION

Figure 1:
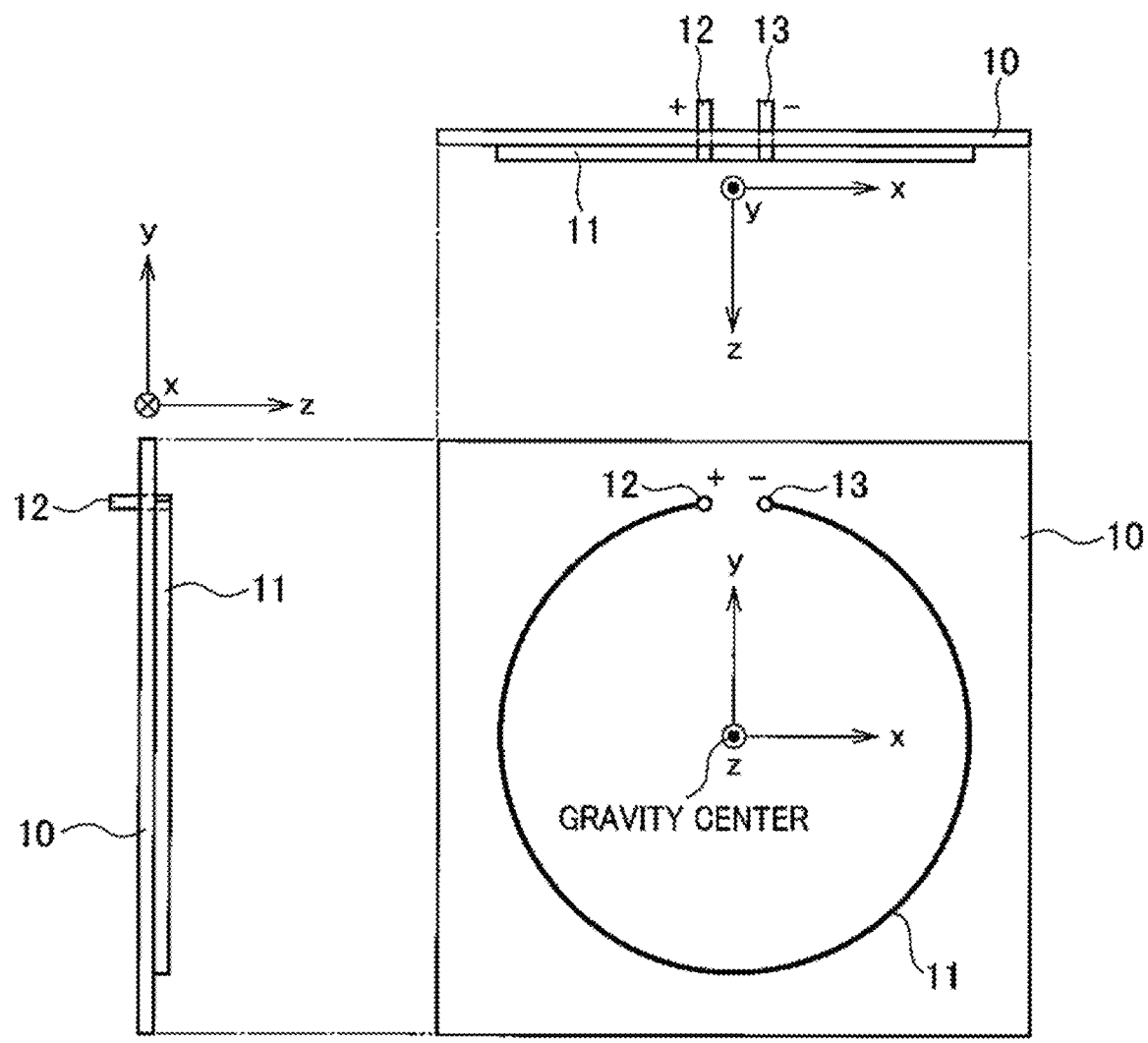
FIG. 1 is a diagram showing a configuration example of a loop antenna that constitutes a dual loop antenna according to an embodiment of the present invention.

Embodiments of the present invention will be described below by using the drawings. The same constituents in the drawings will be denoted by the same reference numerals and explanations thereof will not be repeated.

A loop antenna constituting a dual loop antenna according to an embodiment will be described to begin with. FIG. 1 is a diagram showing a configuration example of this loop antenna 11.

The loop antenna 11 has a structure of an open loop of a conductor pattern formed on an insulator substrate 10. The conductor pattern having a predetermined radius from the gravity center (the center) of the insulator substrate 10 is annularly formed, and the open loop is formed by cutting out a portion in the direction of 12 o'clock.

Two terminals of the open loop are feeding points 12 and 13. The feeding point 12 is a positive terminal while the feeding point 13 is a negative terminal, for example. Note that the polarities may switch around.

A loop surface formed from the conductor pattern of the loop antenna 11 is assumed to be parallel to an x-y plane. The x-y plane is a vertical plane in this example.

A magnetic dipole moment vector (hereinafter a magnetic moment vector) in a direction of a right-handed screw is generated when a current is fed according to the polarities shown in FIG. 1, whereby a magnetic field is generated. The direction of the magnetic moment vector is perpendicular (in a direction of a normal line) to the loop surface (the x-y plane). When the current is fed according to the aforementioned polarities, the magnetic moment vector is generated in +z direction.

Note that the current and the magnetic field always have the same phase. If the direction of the current is inverted, then the direction of the magnetic field is inverted as well.

Figure 2:
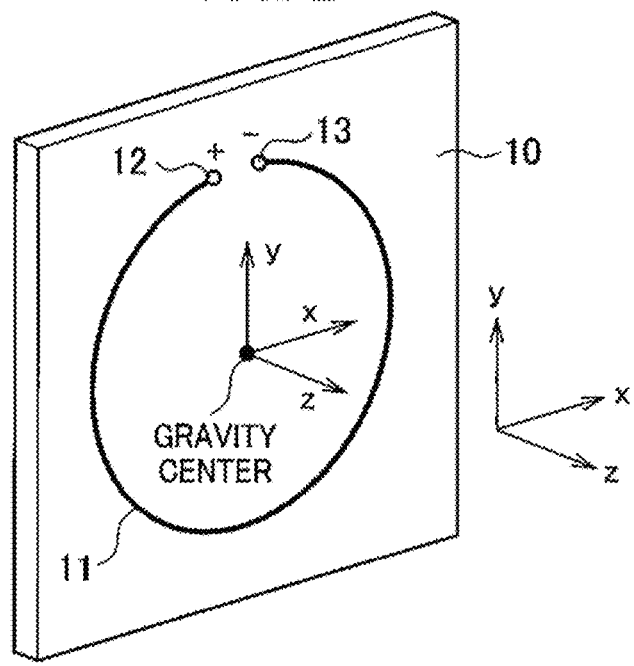
FIG. 2 is a perspective view of the loop antenna shown in FIG. 1.

FIG. 2 is the perspective view of the loop antenna 11. Coordinate systems will be defined as shown in FIG. 2. A vertical direction will be defined as a y-axis, a direction orthogonal to the vertical direction and parallel to the loop surface will be defined as an x-axis, and a direction of a normal line to the loop surface will be defined as a z-axis.

First Embodiment

Figure 3:
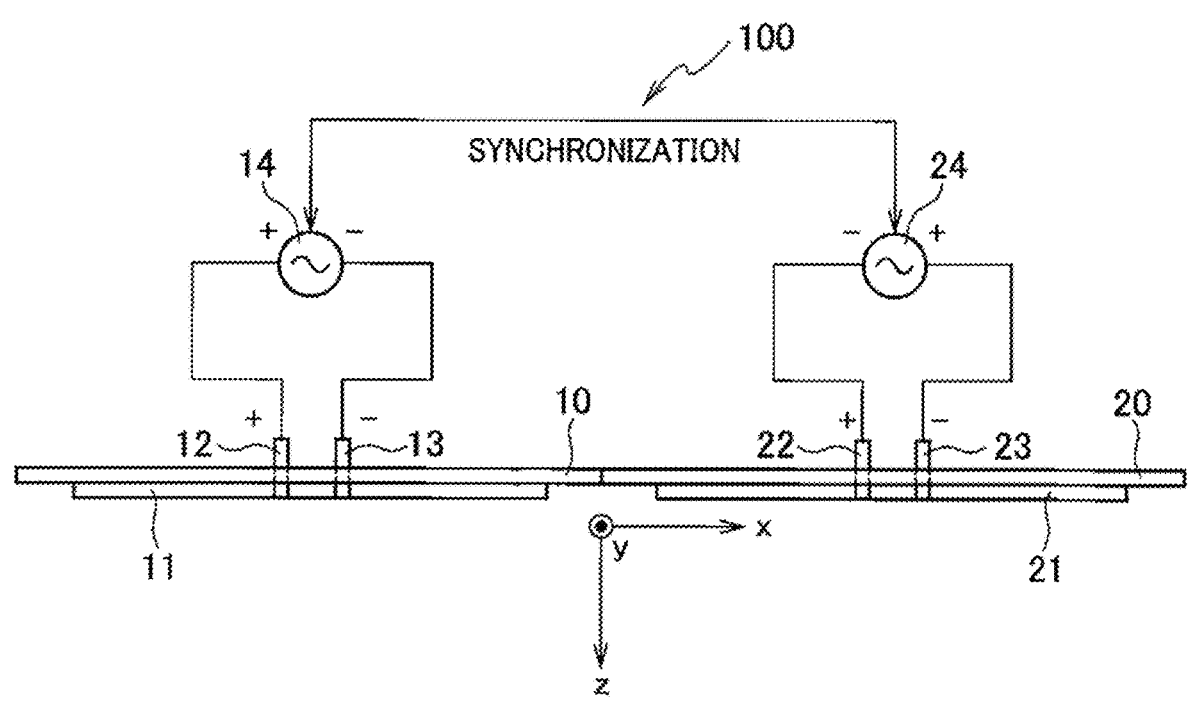
FIG. 3 is a diagram showing a configuration example of a dual loop antenna according to a first embodiment.

FIG. 3 is a diagram showing a configuration example of a dual loop antenna according to a first embodiment. A dual loop antenna 100 of this embodiment is formed by serially arranging two loop antennas 11 shown in FIG. 1. Note that the loop antennas may include helical antennas such as bar antennas. A configuration example adopting such bar antennas will be described later.

Insulator substrates 10 and 20 oriented in the vertical direction are arranged in a line. A first loop antenna 11 and a second loop antenna 21 are formed on flat surfaces of the insulator substrates 10 and 20, respectively.

In the example shown in FIG. 3, conductor patterns (the number of turns N=1) of the first loop antenna 11 and the second loop antenna 21 have the same diameter. However, these conditions do not have to coincide with each other. The diameters of the first loop antenna 11 and the second loop antenna 21 may be different as long as the magnitudes of magnetic moments m defined by the following formula coincide with each other:

[Mathematical 1]

$$m = I_{RMS} \times S_{eff} \quad (1).$$

Here, $I_{RMS}$ is an effective value of an antenna current and $S_{eff}$ is an effective area of the loop antenna. Note that the magnetic moment vector is a vector of the magnetic moment m.

A positive electrode of a signal source 14 is connected to the feeding point 12 of the first loop antenna 11 and a negative electrode of the signal source 14 is connected to the feeding point 13 thereof. When the antenna current flows in this direction, the direction of the magnetic moment vector generated on the first loop antenna 11 is +z direction.

A negative electrode of a signal source 24 is connected to a feeding point 22 of the second loop antenna 21 and a positive electrode of the signal source 24 is connected to a feeding point 23 thereof. When the antenna current flows in this direction, the direction of the magnetic moment vector generated on the second loop antenna 21 is −z direction.

The signal sources 14 and 24 are synchronized alternating-current signal sources. Accordingly, the direction of the magnetic moment vector of the first loop antenna 11 and that of the second loop antenna 21 are always opposite to each other.

Figure 4A:
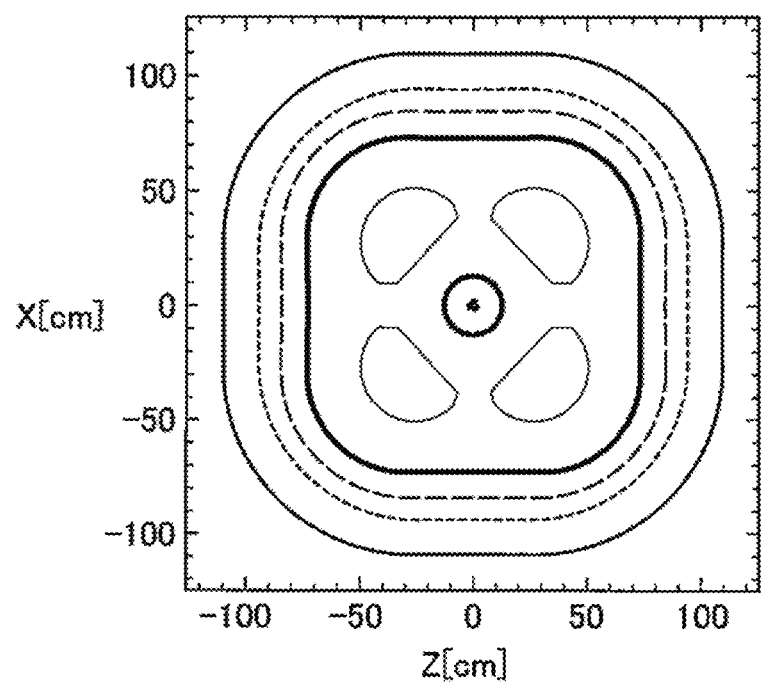
FIG. 4(a) and FIG. 4(b), collectively

FIG. 4 shows an example of magnetic field distribution created by the dual loop antenna 100. FIG. 4(a) shows the magnetic field viewed from +y direction (from above), in which the center of the dual loop antenna 100 is defined as the point of origin (x=0, y=0, z=0).

Closed curves shown in FIG. 4(a) represent contour lines on which magnetic field strength is 58 dBμA/m on planes satisfying y=0, 50, 60, 70, 80 cm from the outer side, respectively. A distance between the centers of the first loop antenna 11 and of the second loop antenna 21 is set to d=10 cm.

As shown in FIG. 4, the shape of the contour line when y=0 is such a shape that the x direction is equal to the y direction. In other words, a communication area that is balanced in front-back and right-left directions is created around the dual loop antenna 100.

A communication area having the magnetic field strength of 58 dBμA/m represented by the closed curve (a solid line) when y=0 has dimensions of about 220 cm in the x direction and about 220 cm in the z direction with an aspect ratio of 1. Note that a closed curve is split into pieces when y=80 cm (thin solid lines) and a drop in magnetic field strength is observed near the point of origin.

Figure 4B:
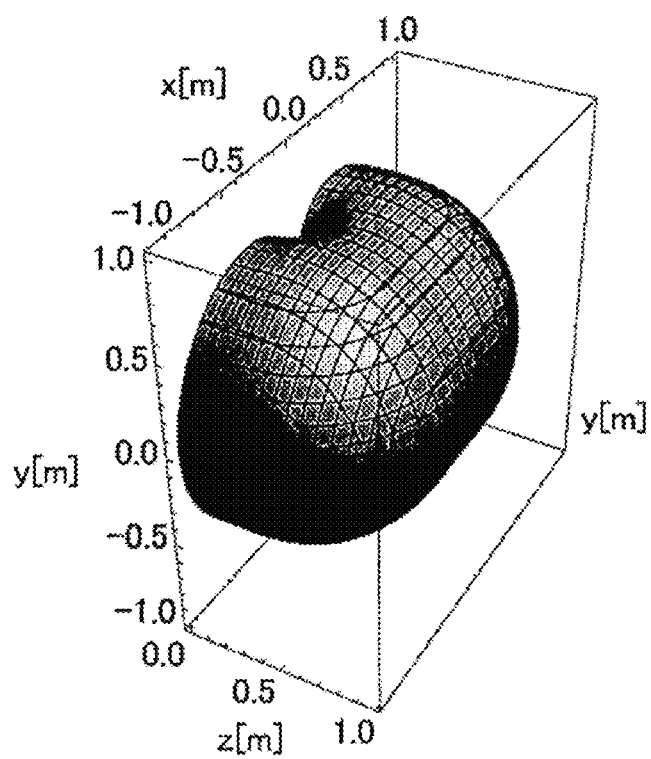

FIG. 4(b) is a diagram three-dimensionally representing the strength of the magnetic field that the dual loop antenna 100 generates in a region satisfying z>0. As shown in FIG. 4(b), the magnetic field strength of the dual loop antenna 100 has a shape like a fruit pear, for instance. In other words, this shape represents a characteristic that the magnetic field strength attenuates at an upper part on the center axis. Here, it is also apparent from FIG. 4(b) that the communication area is created in a well-balanced fashion in the front-back and right-left directions from the center of the antenna.

Next, a description will be given of a relation of the shape of the communication area with a phase difference between feed signals to the first loop antenna 11 and the second loop antenna 21.

FIG. 5 shows the magnetic field distribution when changing a phase difference δ between the feed signals to the first loop antenna 11 and the second loop antenna 21. The relation between the horizontal axis and the vertical axis in FIG. 5 is the same as that in FIG. 4. The phase difference δ is changed by increments of 10° from 0° to 250°, and some of the results are illustrated therein. The magnitudes of the communication areas are compared on the conditions of y=0 and the magnetic field strength at 58 dBµA/m.

FIG. 5(a) shows the magnetic field distribution when the phase difference δ=0°. The dimension in the z direction of the communication area at the magnetic field strength of 58 dBµA/m is about 215 cm and the dimension in the x direction thereof is about 173 cm. Accordingly, the aspect ratio is no longer equal to 1 and the communication area becomes smaller than the case where phase difference δ=180°. The communication area shown in FIG. 5(a) does not change until the phase difference δ=120°, and its improvement begins from the phase difference δ=130°.

FIG. 5(b) shows the magnetic field distribution when the phase difference δ=130°. The dimension in the z direction of the communication area is about 215 cm and the dimension in the x direction thereof is about 176 cm.

In the case of the phase difference δ=170° (characteristics thereof are not illustrated), the dimension in the z direction of the communication area is about 215 cm and the dimension in the x direction thereof is about 200 cm. In this way, the aspect ratio of the communication area is improved and becomes closer to 1 as the phase difference δ becomes closer to 180°.

FIG. 5(c) shows the magnetic field distribution when the phase difference δ=180°. FIG. 5(c) is the same as FIG. 4(a). When the phase difference δ=180°, the dimension in the z direction of the communication area is about 220 cm and the dimension in the x direction thereof is about 220 cm with the aspect ratio of 1.

As the phase difference δ is further increased, the dimensions of the communication area at the phase difference δ=240° becomes substantially equal to those at the phase difference δ=0°. FIG. 5(d) shows the magnetic field distribution when the phase difference δ=240°. The dimension in the z direction of the communication area is about 215 mm and the dimension in the x direction thereof is about 173 cm, which are the same as those of the communication area when the phase difference δ=0°.

Accordingly, the aspect ratio of the communication area is improved by setting the phase difference δ between the feed signals to the first loop antenna 11 and the second loop antenna 21 in a range from δ=130° to δ=230°.

As described above, the dual loop antenna 100 with the improved aspect ratio of the communication area is the dual loop antenna including the first loop antenna 11 and the second loop antenna 21 each having the number of turns n (n≥1), in which the loop surface of each of the first loop antenna 11 and the second loop antenna 21 is formed in the vertical direction, the centers of the first loop antenna 11 and the center of the second loop antenna 21 are located at positions on the x-axis being orthogonal to the vertical direction and parallel to the loop surfaces and at the same distance from the point of origin being the center of the dual loop antenna 100, respectively. The phase difference between the currents flowing on the first loop antenna 11 and the second loop antenna 21, respectively, is a value in the range from 130 degrees to 230 degrees.

Here, according to the dual loop antenna 100 of this embodiment, the closed curve is split into pieces when y=80 cm (the thin solid lines) as shown in FIG. 4(a). Moreover, the magnetic field strength at the upper part on the center axis exhibits the attenuating characteristic. These characteristics are likely to cause unstable communication and may therefore be undesirable. Next, a description will be given of a second embodiment designed to improve these characteristics.

Second Embodiment

Figure 6:
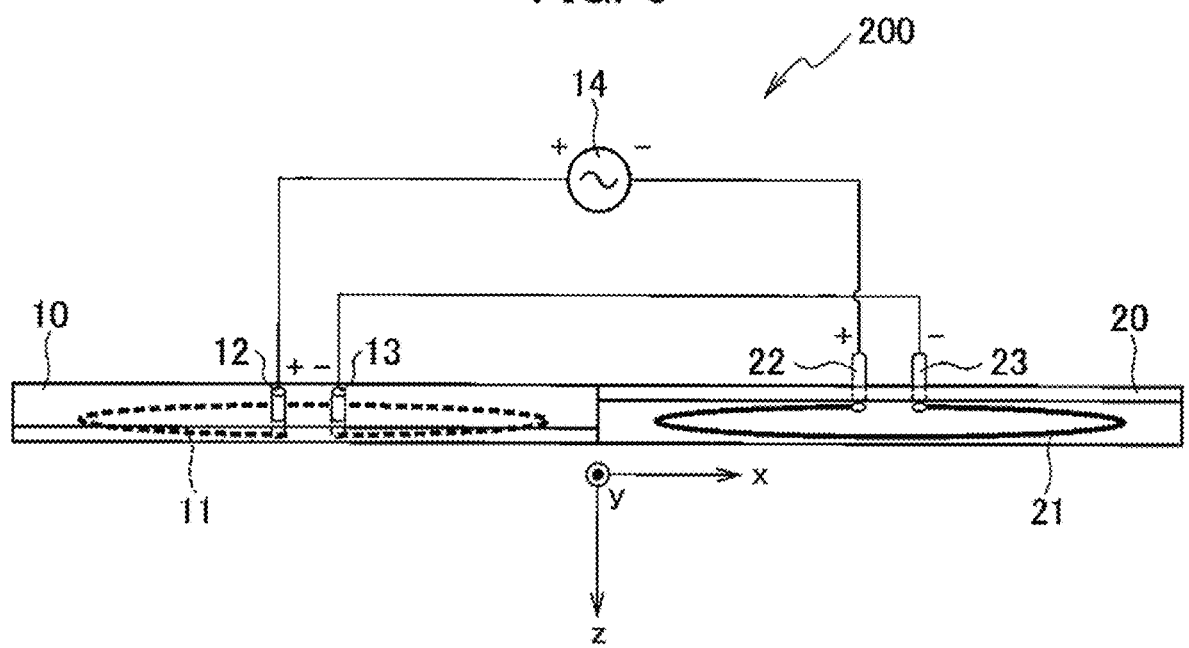
FIG. 6 is a diagram showing a configuration example of a dual loop antenna according to a second embodiment.

FIG. 6 is a diagram showing a configuration example of a dual loop antenna 200 according to the second embodiment. The dual loop antenna 200 is different from the dual loop antenna 100 (FIG. 3) in that the respective insulator substrates 10 and 20 are turned around the x-axis. The dual loop antenna 200 is also different in that the single signal source 14 feeds the antenna currents having the mutually opposite phases to the first loop antenna 11 and to the feeding point 12. As mentioned above, the single signal source 14 may feed the currents to the two loop antennas.

Figure 7:
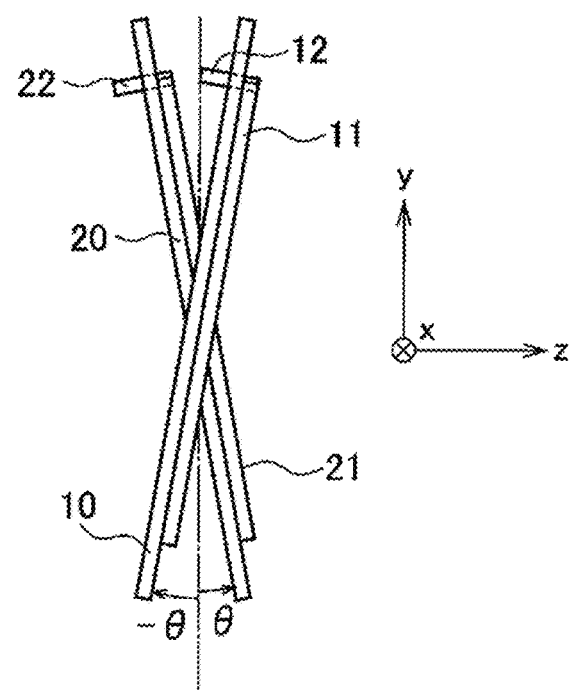
FIG. 7 is a diagram showing external appearance of the dual loop antenna illustrated in FIG. 6, which is viewed from sideways (on an x-axis).

FIG. 7 is a diagram showing external appearance of the dual loop antenna 200 viewed from a position defined as −x, y=0, and z=0. The insulator substrate 10 on the viewpoint side is turned by θ° clockwise around the x-axis and has a depression angle with respect to the y-axis. Meanwhile, the insulator substrate 20 located on the back in light of the viewpoint side is turned by θ° counterclockwise around the x-axis and has an elevation angle with respect to the y-axis. As for the turning angle θ, the counterclockwise direction is defined as +, for instance.

As a consequence of turning the respective insulator substrates 10 and 20 around the x-axis as described above, the magnetic moment vector of the first loop antenna 11 is no longer parallel to the magnetic moment vector of the second loop antenna 21. In this way, this embodiment can improve the aforementioned characteristics that cause the unstable communication.

Figure 8:
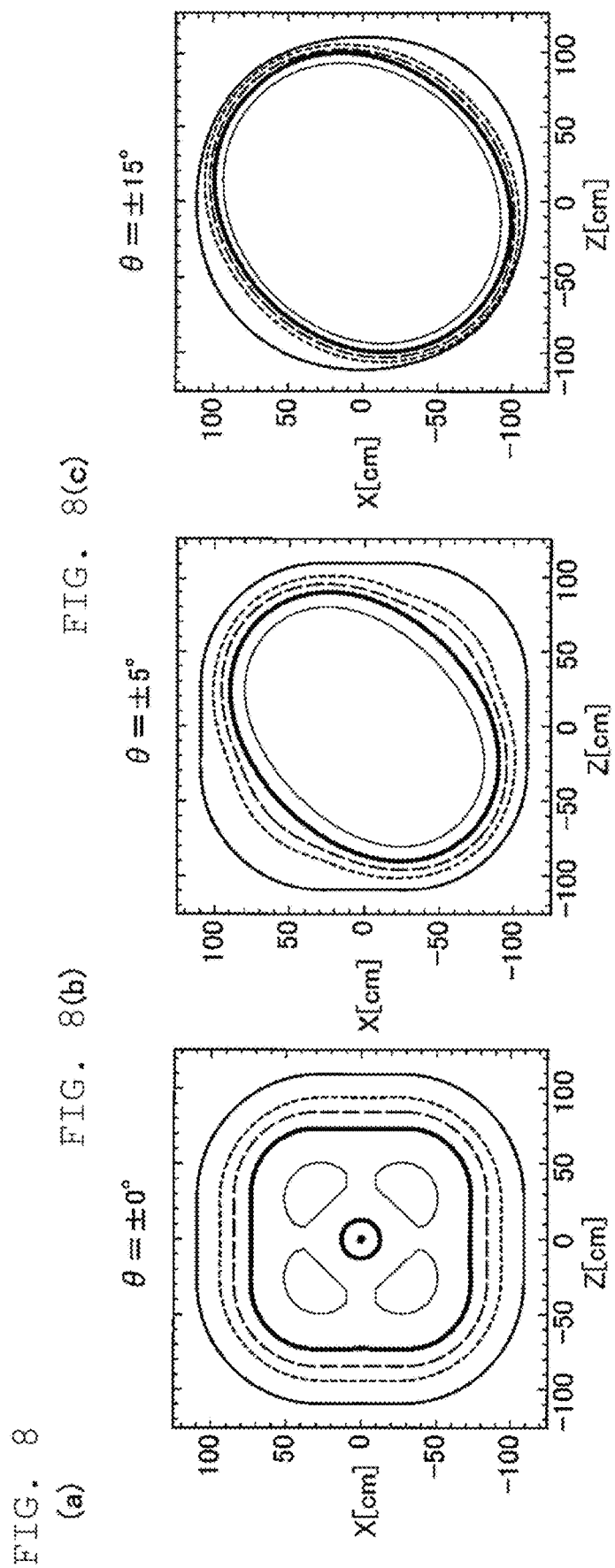

FIG. 8 shows variations in magnetic field distribution when the insulator substrates 10 and 20 of the dual loop antenna 200 are turned around the x-axis. FIG. 8(a) shows the case where the turning angle θ=±0°, which is the same as FIG. 4(a) and FIG. 5(c) discussed above.

FIG. 8(b) shows the case where θ=±5° and FIG. 8(c) shows the case where θ=±15°. In each case, the characteristic of the split of the closed curve when y=80 cm (the thin solid lines) is resolved and the drop in magnetic field strength near the point of origin also disappears.

As described above, in the dual loop antenna 200 of this embodiment, the loop surface of the first loop antenna 11 is turned by −θ degrees around the x-axis while the loop surface of the second loop antenna 21 is turned by +θ degrees around the x-axis and the phase difference δ between the currents is δ=180°. In this way, this embodiment can improve the characteristics that cause the unstable communication. Here, the phase difference δ between the feeding signals to the first loop antenna 11 and the second loop antenna 21 may be changed. Such an example will be described later.

Third Embodiment

Figure 9:
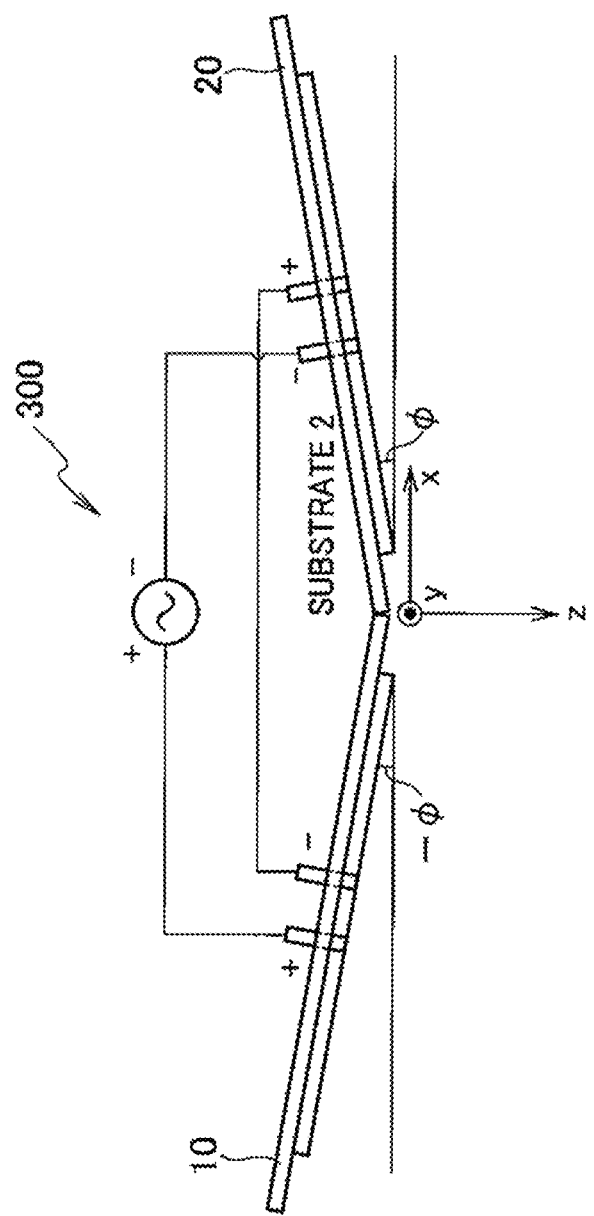
FIG. 9 is a diagram showing a configuration example of a dual loop antenna according to a third embodiment.

FIG. 9 is a diagram showing a configuration example of a dual loop antenna 300 according to a third embodiment. The dual loop antenna 300 is different from the dual loop antenna 100 (FIG. 3) in that the respective insulator substrates 10 and 20 are turned around the y-axis. Note that the single signal source 14 feeds the currents to the two antennas as with the second embodiment.

As shown in FIG. 9, the insulator substrate 10 is turned by −ϕ° clockwise around the y-axis while the insulator substrate 20 is turned by ϕ° counterclockwise around the y-axis. As for the turning angle ϕ, the counterclockwise direction is defined as +, for instance.

As a consequence of turning the respective insulator substrates 10 and 20 around the y-axis as described above, the magnetic moment vector of the first loop antenna 11 is no longer parallel to the magnetic moment vector of the second loop antenna 21. In this way, this embodiment can improve the aforementioned characteristics that cause the unstable communication.

Figure 10:
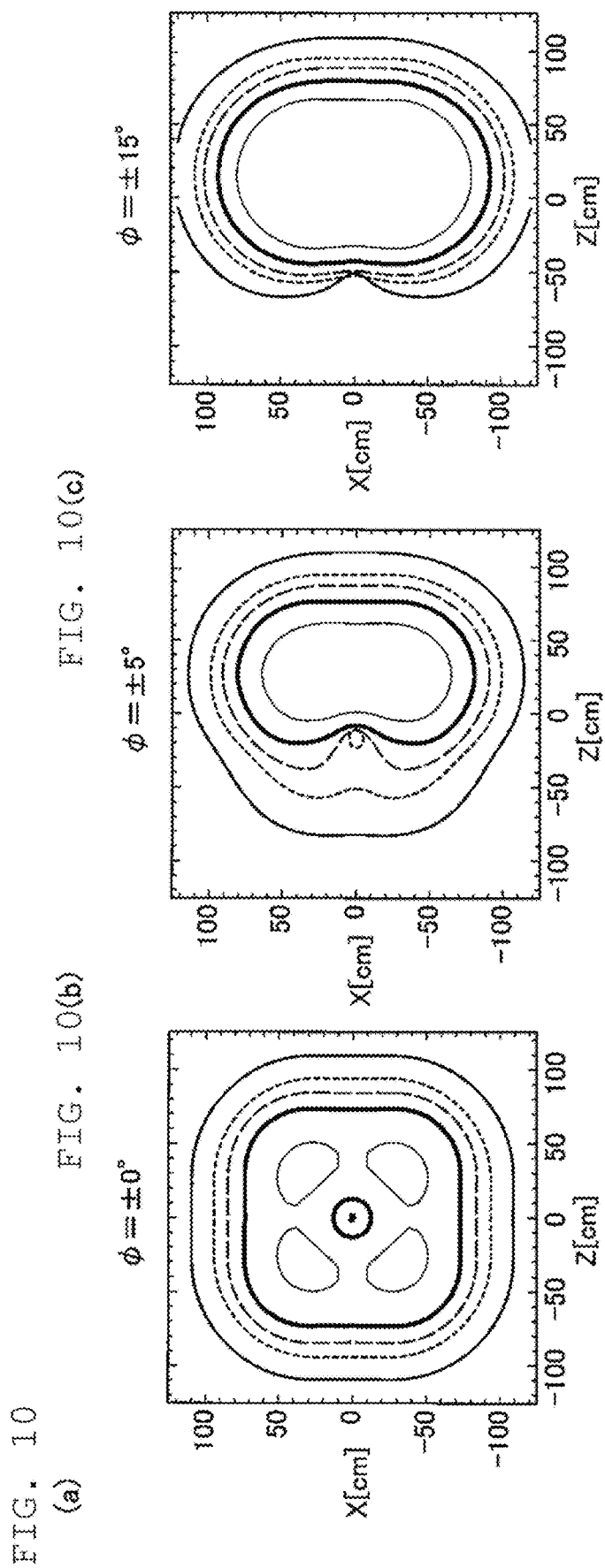

FIG. 10 shows variations in magnetic field distribution when the insulator substrates 10 and 20 of the dual loop antenna 300 are turned around the y-axis. FIG. 10(a) shows the case where the turning angle ϕ=0°, which is the same as FIG. 4(a), FIG. 5(c), and FIG. 8(a) discussed above.

FIG. 10(b) shows the case where ϕ=±5° and FIG. 10(c) shows the case where ϕ=±15°. In each case, the characteristic of the split of the closed curve when y=80 cm (the thin solid lines) is resolved and the drop in magnetic field strength near the point of origin also disappears. Moreover, the layout of the first loop antenna 11 and the second loop antenna 21 is also reflected in each case, whereby the magnetic field is suppressed in a region where z<0 while the magnetic field is strengthened in a region where z>0, thus forming directionality in the direction of z>0.

As described above, in the dual loop antenna 300 of this embodiment, the loop surface of the first loop antenna 11 is turned by −ϕ degrees around the y-axis that is orthogonal to the x-axis in the vertical direction while the loop surface of the second loop antenna 21 is turned by +ϕ degrees around the y-axis and the phase difference ϕ between the currents is ϕ=180°. In this way, this embodiment can improve the characteristics that cause the unstable communication. Moreover, it is also possible to impart the directionality. Here, the phase difference δ between the feeding signals to the first loop antenna 11 and the second loop antenna 21 of the dual loop antenna 300 may be changed. Such an example will be described later.

Although the description has been made herein of the case of turning around the y-axis, the turning axis is not limited to the y-axis. Similar effects are available by using an axis that is parallel to the y-axis. For example, the similar effects can also be obtained by turning the first loop antenna 11 around a straight line being parallel to the y-axis and passing through the center of the first loop antenna 11 and turning the second loop antenna 21 around a straight line being parallel to the y-axis and passing through the center of the second loop antenna 21.

Fourth Embodiment

Figure 11:
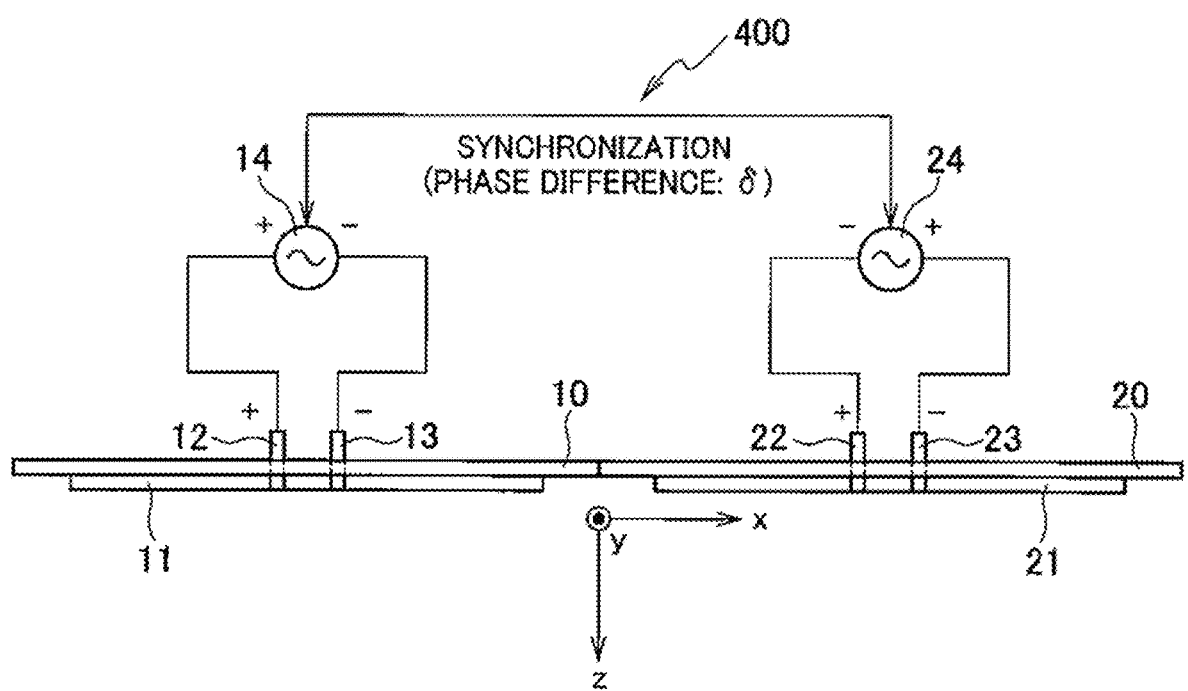
FIG. 11 is a diagram showing a configuration example of a dual loop antenna according to a fourth embodiment.

FIG. 11 is a diagram showing a configuration example of a dual loop antenna 400 according to a fourth embodiment. The dual loop antenna 400 is configured to provide the dual loop antenna 100 (FIG. 3) with the phase difference δ between the antenna currents.

Figure 12:
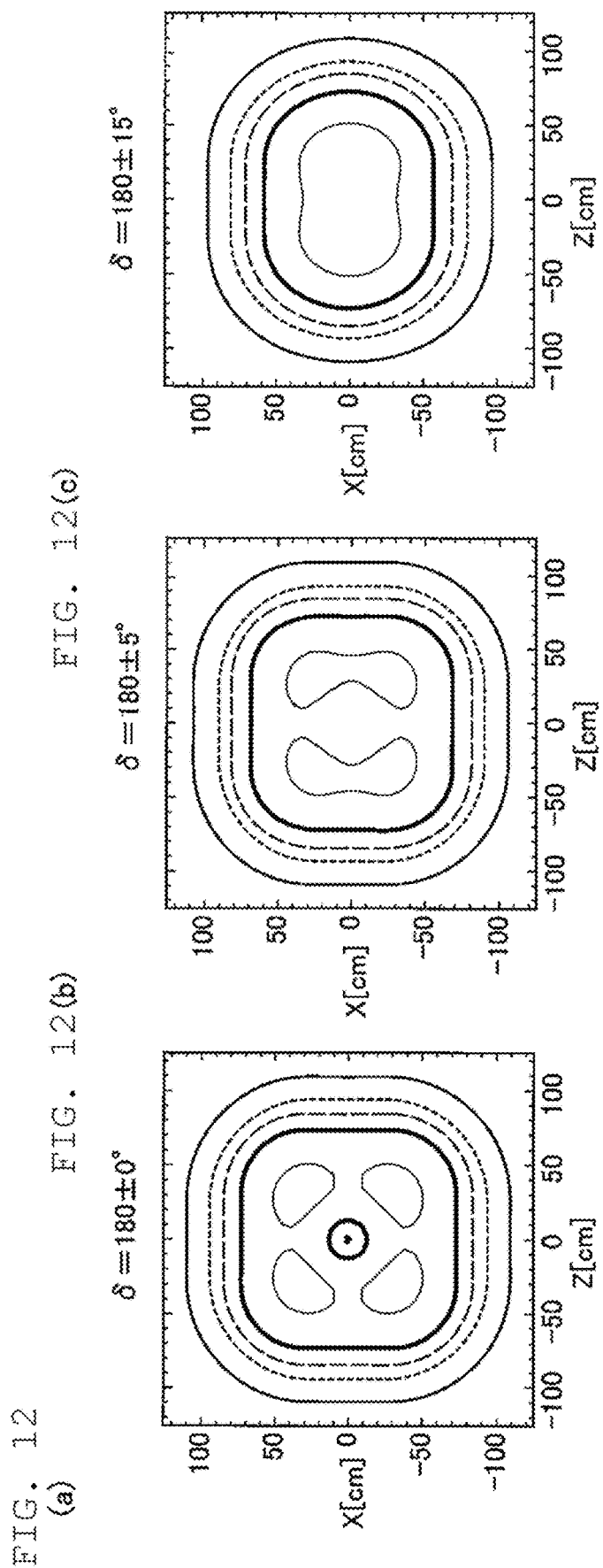

FIG. 12 is a diagram showing variations in magnetic field distribution when the antenna currents on the two antennas in the dual loop antenna 400 are provided with the phase difference δ. Note that this concept has been described in conjunction with the explanation of the first embodiment by using FIG. 5.

FIG. 12(a) shows the magnetic field distribution when the phase difference δ=180±0°. This characteristic is the same as those of the FIG. 4(a) and the like mentioned above. The closed curve is split into pieces when y=80 cm (the thin solid lines) and the drop in magnetic field strength is observed near the point of origin.

FIG. 12(b) shows the magnetic field distribution when δ=180±5°. This distribution corresponds to a case where the phase difference δ=175° and a case where the phase difference δ=185°. Though the drop in magnetic field strength near the point of origin is resolved, the closed curve remains split when y=80 cm (the thin solid lines).

FIG. 12(c) shows the magnetic field distribution when δ=180±15°. This distribution corresponds to a case where the phase difference δ=165° and a case where the phase difference δ=195°. Both of the drop in magnetic field strength near the point of origin and the split of the closed curve when y=80 cm (the thin solid lines) are resolved therein.

As described above, the first loop antenna 11 and the second loop antenna 21 may be formed on the same plane while changing the phase difference δ between the antenna currents to be supplied to the respective loop antennas. The operation and effect of the dual loop antenna 400 of this embodiment are the same as those of the dual loop antenna 100 of the first embodiment.

Fifth Embodiment

Figure 13:
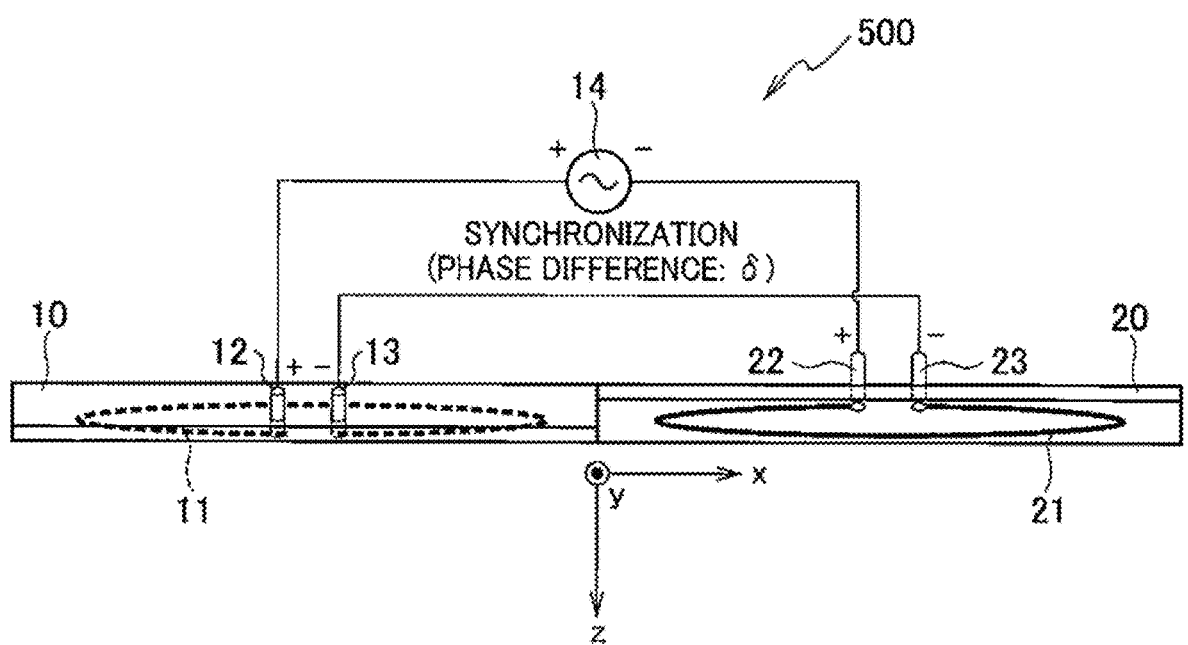
FIG. 13 is a diagram showing a configuration example of a dual loop antenna according to a fifth embodiment.

FIG. 13 is a diagram showing a configuration example of a dual loop antenna 500 according to a fifth embodiment. The dual loop antenna 500 is configured to provide the dual loop antenna 200 (FIG. 6) with the phase difference δ between the antenna currents.

Figure 14A:
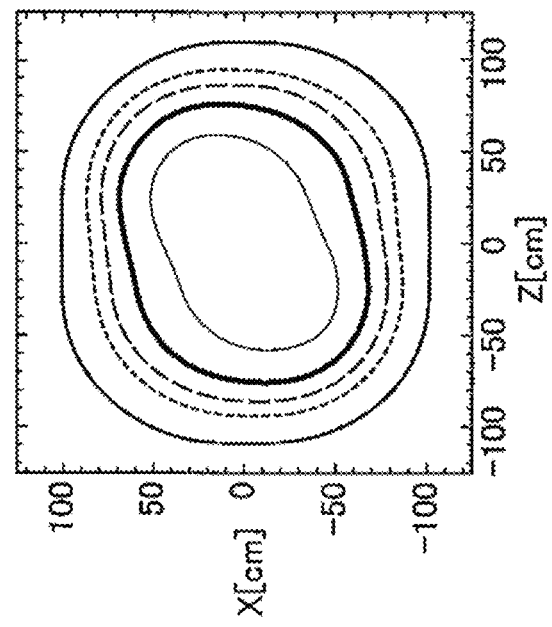
FIG. 14(a) and FIG. 14(b), collectively

FIG. 14 is a diagram showing variations in magnetic field distribution when both of the phase difference δ and the turning angle θ are changed. FIG. 14(a) shows the magnetic field distribution when the phase difference δ=180+10° and the turning angle θ=±0°. Effects of the phase difference δ=180+10° are apparent by comparing this case with the FIG. 8(a) at the same turning angle θ=±0°.

The split of the closed curve when y=80 cm (the thin solid lines) and the drop in magnetic field strength near the point of origin existing in FIG. 8(a) are eliminated in FIG. 14(a) by setting the phase difference δ=180+10°.

Figure 14B:
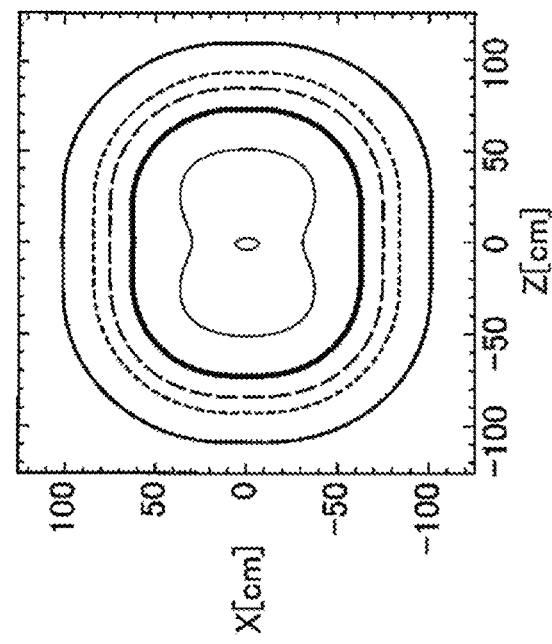

FIG. 14(b) shows the magnetic field distribution when the phase difference δ=180+10° and the turning angle θ=±2°. The aforementioned characteristics that cause the unstable communication are improved in FIG. 14(b) as well.

The phase difference δ and the turning angle θ may be combined as described above. In other words, according to the dual loop antenna 500 of this embodiment, the loop surface of the first loop antenna 11 is turned by −θ° around the x-axis while the loop surface of the second loop antenna 21 is turned by +θ° around the x-axis, and the phase difference δ between the currents is 180±Δδ°. In this way, this embodiment can improve the characteristics that cause the unstable communication.

Sixth Embodiment

FIG. 15 is a diagram showing a configuration example of a dual loop antenna 600 according to a sixth embodiment. The dual loop antenna 600 is configured to provide the dual loop antenna 300 (FIG. 9) with the phase difference δ between the antenna currents.

Figure 16A:
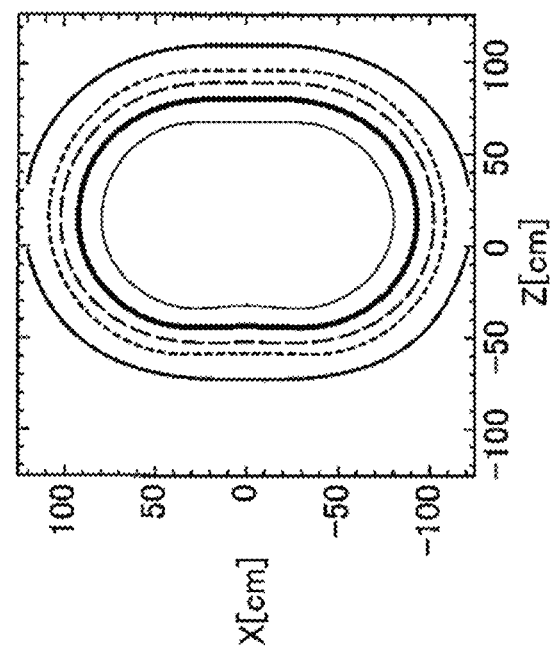
FIG. 16(a) and FIG. 16(b), collectively

FIG. 16 is a diagram showing variations in magnetic field distribution when both of the phase difference δ and the turning angle φ are changed. FIG. 16(a) shows the magnetic field distribution when the phase difference δ=180+0° and the turning angle φ=±15°. Effects of the turning angle φ=±15° are apparent by comparing this case with the FIG. 10(a) at the same phase difference δ=180° and at the turning angle θ=±0°.

The split of the closed curve when y=80 cm (the thin solid lines) and the drop in magnetic field strength near the point of origin existing in FIG. 10(a) are eliminated in FIG. 16(a) by setting the turning angle φ=±15°.

Figure 16B:
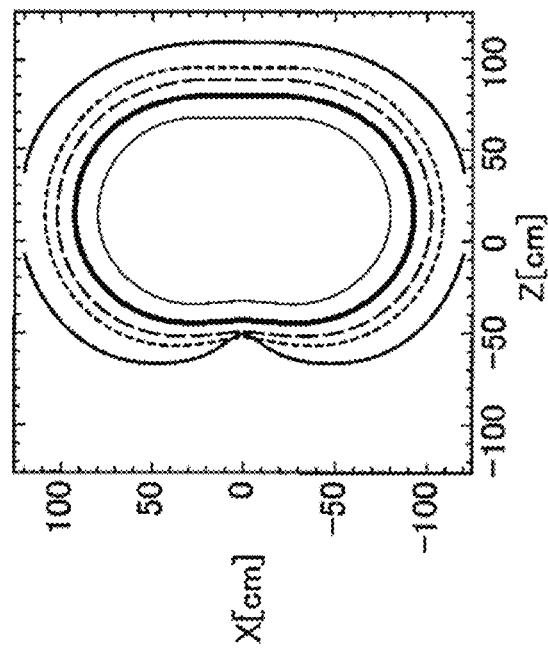

FIG. 16(b) shows the magnetic field distribution when the phase difference δ=180+6° and the turning angle φ=±15°. The aforementioned characteristics that cause the unstable communication are improved in FIG. 16(b) as well. Note that the phase difference δ=180+6° is equivalent to the phase difference δ=180−6°.

The phase difference 180±Δδ° may be combined with the turning angle φ as described above. In other words, according to the dual loop antenna 600 of this embodiment, the loop surface of the first loop antenna 11 is turned by 4° around the y-axis that is orthogonal to the x-axis in the vertical direction while the loop surface of the second loop antenna 21 is turned by +φ° around the y-axis and the phase difference δ between the currents is 180±Δδ degrees. In this way, this embodiment can improve the characteristics that cause the unstable communication.

The above-mentioned first to sixth embodiments have described the examples of using the two loop antennas. However, the loop antennas may be replaced with bar antennas.

Figure 17:
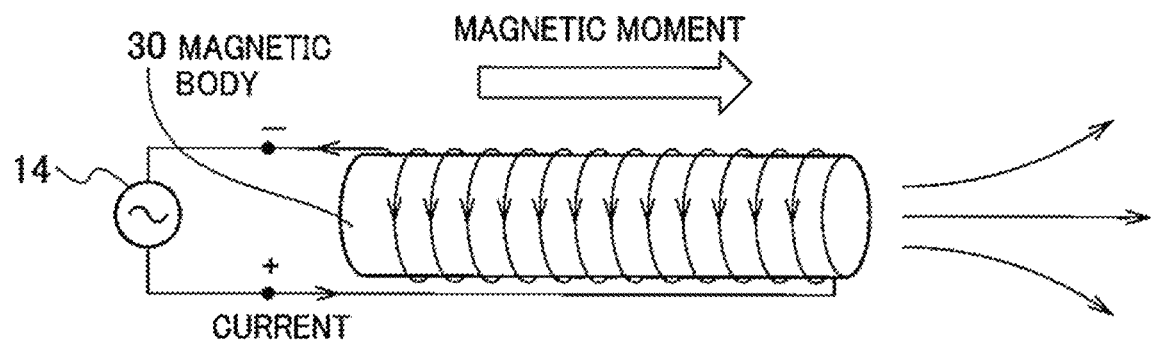
FIG. 17 is a diagram showing a configuration example of a bar antenna constituting a dual loop antenna according to an embodiment of the present invention.

FIG. 17 shows a bar antenna. The bar antenna is a solenoid coil formed by winding a conducting wire around a magnetic body (a bar) 30. The magnetic moment vector in the direction of the right-handed screw is generated when feeding a current thereto, whereby a magnetic field is generated. The direction of the magnetic moment vector is parallel to the bar.

Note that the current and the magnetic field always have the same phase. If the direction of the current is inverted, then the direction of the magnetic field is inverted as well. Accordingly, the loop antennas in the first to sixth embodiments can be replaced with the bar antennas. Next, embodiments of the present invention adopting the bar antennas will be described.

Seventh Embodiment

Figure 18:
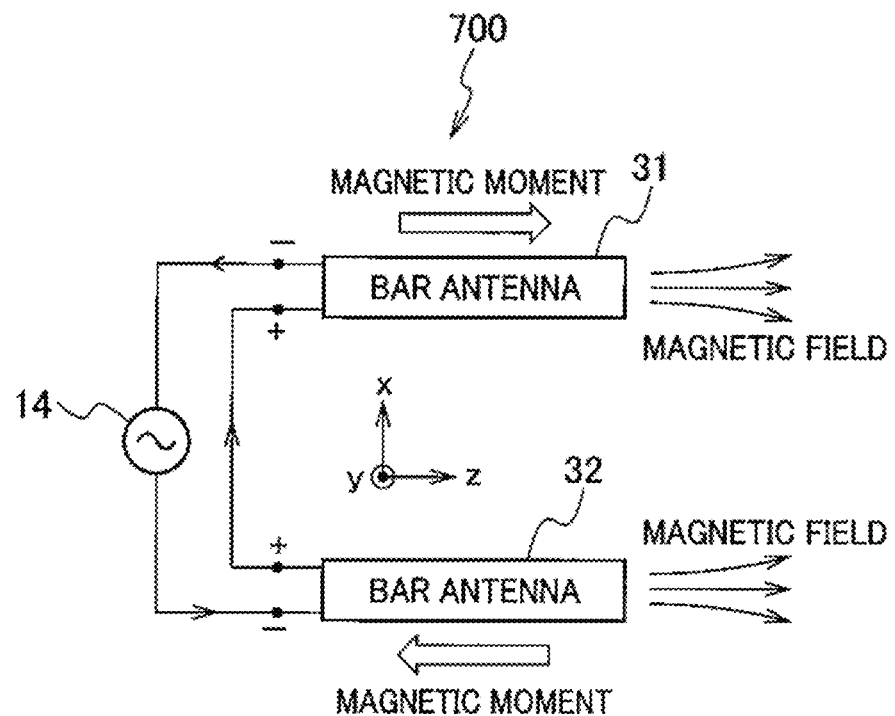
FIG. 18 is a diagram showing a configuration example of a dual loop antenna according to a seventh embodiment.

FIG. 18 is a diagram showing a configuration example of a dual loop antenna 700 according to a seventh embodiment. The dual loop antenna 700 is configured to arrange bar antennas 31 and 32 in parallel on an x-z plane and to cause the bar antennas 31 and 32 to generate the magnetic moment vectors in mutually opposite directions, respectively.

Figure 19:
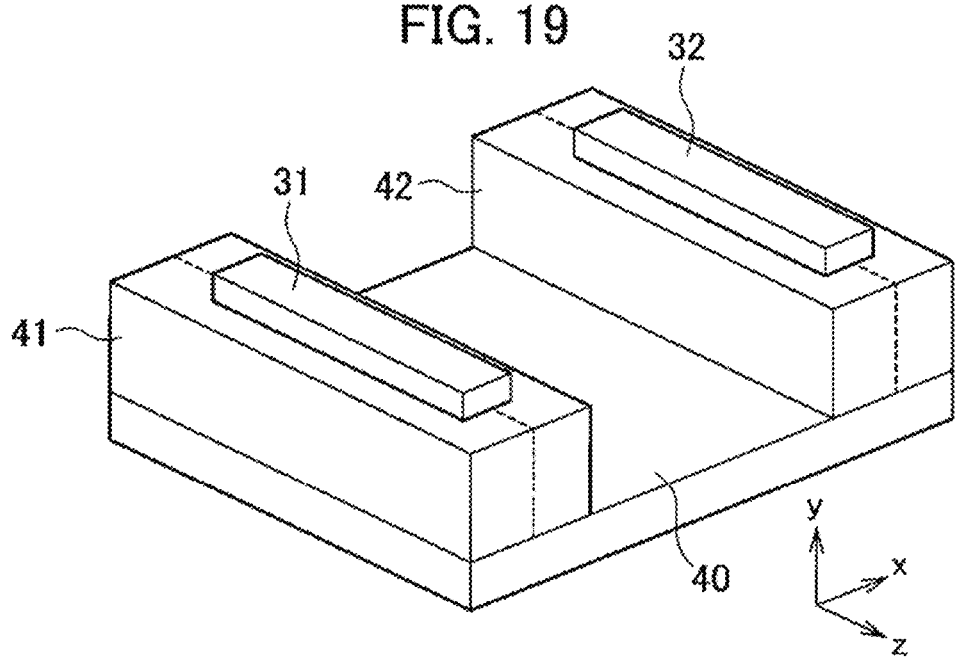
FIG. 19 is a diagram showing a layout example of bar antennas constituting the dual loop antenna illustrated in FIG. 18.

FIG. 19 is a diagram showing a layout example of the bar antennas 31 and 32. Bases 41 and 42 are disposed on two ends of an insulator substrate 40. The bar antenna 31 is placed on the base 41 while the bar antenna 32 is placed on the base 42.

The dual loop antenna 700 is obtained by replacing the loop antennas 11 and 21 of the dual loop antenna 100 (FIG. 3) with the bar antennas 31 and 32. The operation and effect of the dual loop antenna 700 are the same as those of the dual loop antenna 100.

Eighth Embodiment

Figure 20:
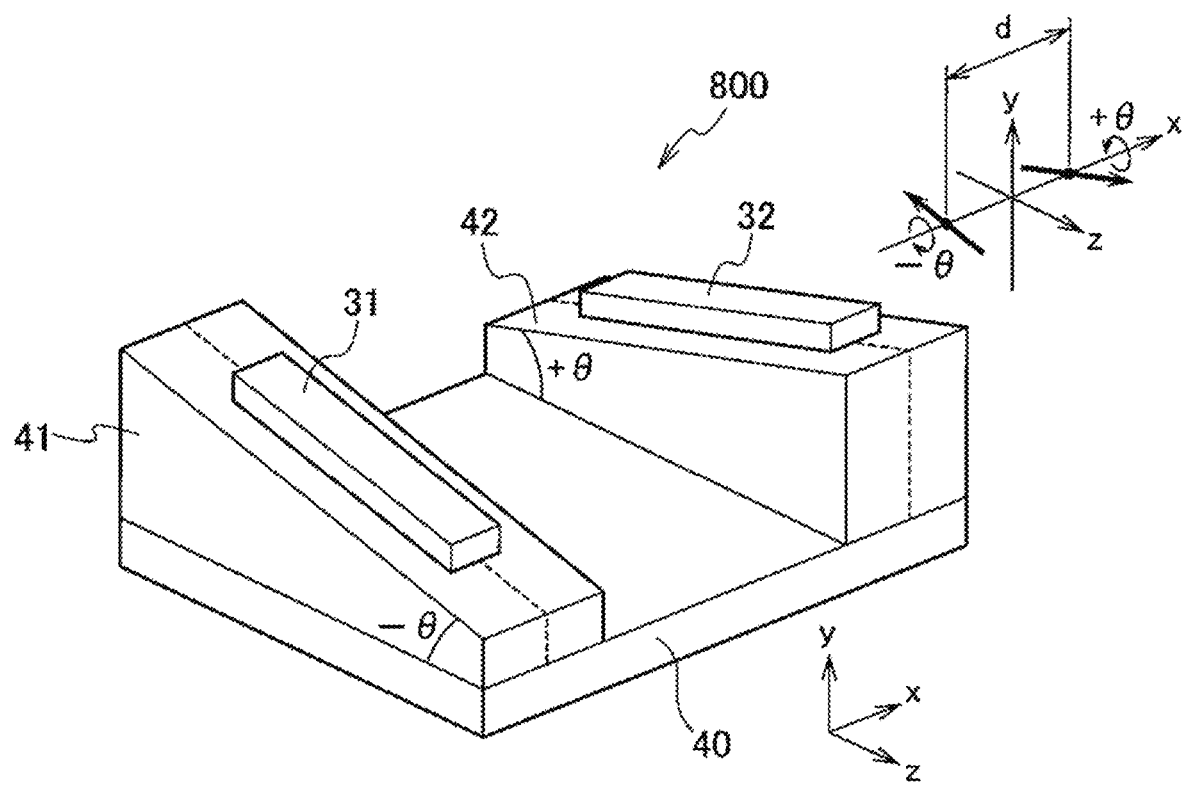
FIG. 20 is a diagram showing a layout example of bar antennas constituting a dual loop antenna according to an eighth embodiment.

FIG. 20 is a diagram showing a layout example of bar antennas in a dual loop antenna 800 according to an eighth embodiment. The dual loop antenna 800 is obtained by replacing the loop antennas 11 and 21 of the dual loop antenna 200 (FIG. 6) with the bar antennas 31 and 32. In this case, the magnetic moment vector of the bar antenna 31 is not parallel to the magnetic moment vector of the bar antenna 32. Accordingly, the operation and effect of the dual loop antenna 800 are the same as those of the dual loop antenna 200.

Ninth Embodiment

Figure 21:
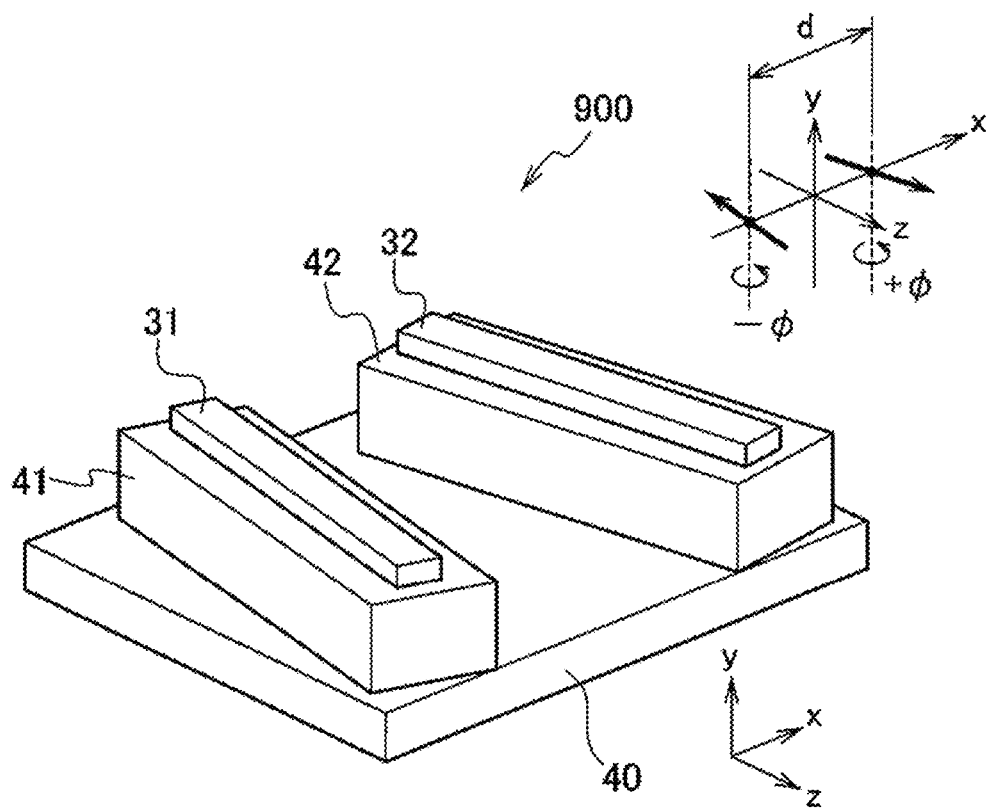
FIG. 21 is a diagram showing a layout example of bar antennas constituting a dual loop antenna according to a ninth embodiment.

FIG. 21 is a diagram showing a layout example of bar antennas in a dual loop antenna 900 according to a ninth embodiment. The dual loop antenna 900 is obtained by replacing the loop antennas 11 and 21 of the dual loop antenna 300 (FIG. 9) with the bar antennas 31 and 32. In this case, the magnetic moment vector of the bar antenna 31 is not parallel to the magnetic moment vector of the bar antenna 32. Accordingly, the operation and effect of the dual loop antenna 900 are the same as those of the dual loop antenna 300.

As described above, each of the first loop antenna 11 and the second loop antenna 21 may be formed from the solenoid coil obtained by winding a coil around the magnetic body 30.

The details of the present invention have been described above with reference to the embodiments. However, it is apparent to those skilled in the art that the present invention is not limited to these descriptions and various alterations and modifications are possible. For example, the shape of each loop antennal may be oval. In the meantime, the shape of each of the insulator substrates 10 and 20 is not limited to a rectangle.

While the example of setting the distance between the centers of the first loop antenna 11 and the second loop antenna 21 to d=10 cm has been discussed above, the above-mentioned operation and effect are available as long as the distance d is a sufficiently smaller distance than the wavelength.

In the meantime, while the magnetic moment vector m has been explained based on the example of setting the number of turns N=1, the number of turns N may be increased. In this way, the present invention is not limited only to the above-described embodiments but various modifications are possible within the scope of the gist of the invention.

INDUSTRIAL APPLICABILITY

These embodiments are applicable to short-distance wireless authentication techniques such as the near field communication (NFC). In the meantime, the embodiments can be used in a vehicle wireless system for securing a stable communication area inside and around an automobile or the like.

EXPLANATION OF THE REFERENCE NUMERALS 10, 20, 40: insulator substrate
11: first loop antenna (loop antenna)
21: second loop antenna (loop antenna)
12, 13, 22, 23: feeding point
14, 24: signal source
30: magnetic body
31, 32: bar antenna
41, 42: base
100, 200, 300, 400, 500, 600, 700, 800, 900: dual loop antenna

The invention claimed is:

1. A dual loop antenna comprising:
a first loop antenna; and
a second loop antenna, wherein
the first loop antenna and the second loop antenna are formed on an x-y plane,
a center of the first loop antenna and a center of the second loop antenna are located at positions on an x-axis at the same distance from a point of origin being a center of the dual loop antenna, and
a phase difference between currents flowing on the first loop antenna and the second loop antenna, respectively, is a value in a range from 130 degrees to 230 degrees
wherein
the first loop antenna is turned by $-\theta$ ($0<\theta$) degrees around the x-axis,
the second loop antenna is turned by $+\theta$ ($0<\theta$) degrees around the x-axis, and
the phase difference between the currents is any of $180\pm\delta$ ($0<\delta$) degrees.

2. The dual loop antenna according to claim 1, wherein a magnetic moment vector of the first loop antenna is not parallel to a magnetic moment vector of the second loop antenna.

3. A dual loop antenna comprising:
a first loop antenna; and
a second loop antenna, wherein
the first loop antenna and the second loop antenna are formed on an x-y plane, a center of the first loop antenna and a center of the second loop antenna are located at positions on an x-axis at the same distance from a point of origin being a center of the dual loop antenna, and
a phase difference between currents flowing on the first loop antenna and the second loop antenna, respectively, is a value in a range from 130 degrees to 230 degrees
wherein
the first loop antenna is turned by $-\phi$ ($0<\phi$) degrees around any of a y-axis orthogonal to the x-axis in a vertical direction and the second loop antenna is turned by $+\phi$ ($0<\phi$) degrees around the y-axis or the first loop antenna is turned by $-\phi$ ($0<\phi$) degrees around an axis parallel to the y-axis and the second loop antenna is turned by $+\phi$ ($0<\phi$) degrees around the axis parallel to the y-axis, and
the phase difference between the currents is any of $180\pm\delta$ ($0<\delta$) degrees.

4. The dual loop antenna according to claim 1, wherein each of the first loop antenna and the second loop antenna is a solenoid coil formed by winding a coil around a magnetic body.

5. The dual loop antenna according to claim 3, wherein a magnetic moment vector of the first loop antenna is not parallel to a magnetic moment vector of the second loop antenna.

6. The dual loop antenna according to claim 3, wherein each of the first loop antenna and the second loop antenna is a solenoid coil formed by winding a coil around a magnetic body.

* * * * *